(12) United States Patent
Dauben et al.

(10) Patent No.: US 6,399,720 B1
(45) Date of Patent: Jun. 4, 2002

(54) METHOD FOR AVOIDING INSTABILITIES DURING GAS PHASE POLYMERIZATION OF RUBBER

(75) Inventors: Michael Dauben, Neuss; Wolfgang Nentwig, Bergisch Gladbach; Jürgen M. Schneider, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/600,366

(22) PCT Filed: Jan. 7, 1999

(86) PCT No.: PCT/EP99/00038

§ 371 (c)(1),
(2), (4) Date: Jul. 14, 2000

(87) PCT Pub. No.: WO99/37698

PCT Pub. Date: Jul. 29, 1999

(30) Foreign Application Priority Data

Jan. 20, 1998 (DE) .......................................... 198 01 859

(51) Int. Cl.⁷ .................................................. C08F 2/34
(52) U.S. Cl. ............................ 526/88; 526/87; 526/901
(58) Field of Search ............................. 526/87, 88, 901

(56) References Cited

U.S. PATENT DOCUMENTS

| | | | | |
|---|---|---|---|---|
| 5,162,463 A | * | 11/1992 | Baker et al. .................... | 526/74 |
| 5,541,270 A | | 7/1996 | Chinh et al. .................... | 526/68 |
| 5,668,228 A | | 9/1997 | Chinh et al. .................... | 526/67 |
| 5,733,510 A | | 3/1998 | Chinh et al. ................. | 422/143 |
| 5,804,677 A | | 9/1998 | Chinh et al. .................... | 526/68 |
| 6,001,938 A | | 12/1999 | Chinh et al. .................... | 526/68 |

FOREIGN PATENT DOCUMENTS

| | | |
|---|---|---|
| DE | 2357848 | 7/1974 |
| EP | 266074 | 5/1988 |
| EP | 89691 | 11/1989 |
| EP | 422452 | 4/1991 |
| EP | 241947 | 10/1992 |
| EP | 530709 | 3/1993 |
| EP | 570966 | 11/1993 |
| EP | 697421 | 2/1996 |
| EP | 780404 | 6/1997 |
| WO | 94/25495 | 11/1994 |
| WO | 94/25497 | 11/1994 |
| WO | 97/08211 | 3/1997 |

OTHER PUBLICATIONS

Ullmanns Enzyklopadie de Technischen Chemie, vol. 21, (date unavailable), pp. 439–476, Dr. R. Weiss, et al, "Siliciumdioxid".

Ullmanns Enzyklopadie der Technischen Chemie, vol. 24, (date unavailable), pp. 575–578, Dr. M. Mengel, "Zeolithe".

Ullmanns Enzyklopadie der Technischen Chemie, vol. 14, (date unavailable), pp. 633–651, "Einleitung".

Ullmanns Enzyklopadie der Technischen Chemie, vol. 17, (date unavailable), pp. 9–18, Dr. L. Puppe, "Molekularsiebe".

Ullmanns Enzyklopadie der Technischen Chemie, vol. 23, (date unavailable), pp. 311–326, Dr. G. Lagaly, et al, "Ton und Tonminerale".

Ullmanns Enzyklopadie der Technischen Chemie, vol. 19, (month unavailable), 1980, pp. 186–211, 4th Ed., "Polyolefine".

* cited by examiner

*Primary Examiner*—David W. Wu
*Assistant Examiner*—William K Cheung
(74) *Attorney, Agent, or Firm*—Joseph C. Gil; Noland J. Cheung

(57) ABSTRACT

The present invention relates to a process for the avoidance of instability during the gas polymerization of rubber comprising the feeding of low volatility monomers supported in a particulate material into a fluidized bed reactor.

17 Claims, No Drawings

METHOD FOR AVOIDING INSTABILITIES DURING GAS PHASE POLYMERIZATION OF RUBBER

FIELD OF THE INVENTION

The present invention relates to a process for the avoidance of instability during the gas phase polymerization of rubber when using low volatility monomers, characterized in that the low volatility monomers are fed into the fluidized bed reactor supported on a particulate material.

BACKGROUND OF THE INVENTION

The gas phase polymerization of polyolefins is a process which has long been known and was first implemented on a large industrial scale as long ago as 1968 (*Ullmanns Enzyklopädie der technischen Chemie*, 4th edition 1980, volume 19, pp. 186 et seq.).

In this process, the actual polymerization-reaction proceeds in a fluidized bed reactor which consists of a reaction zone and an equalizing zone thereabove, in which the solid particles are largely separated from the gas phase. The monomers, additives and the catalyst are introduced into the reaction zone. A recirculating gas stream is also introduced into the reactor, likewise from beneath, in order maintain an adequate fluidized bed. This recirculating gas stream, which substantially consists of unreacted monomers, is drawn off again from the top of the reactor, residual particles are removed, the gas cooled and recirculated into the reactor. The resultant polymer is continuously or semi-continuously drawn off from the reaction zone and further processed.

One of the greatest problems in gas phase polymerization is feeding low volatility monomers in liquid form. One the one hand, a homogeneous distribution may be achieved only with difficulty, which gives rise to unwanted non-uniformities in the products, and, on the other, the fluidized bed is susceptible to disruption by the introduction of the liquid. The growing polymer particles swell on addition of the liquid monomer, which results in agglomeration and agglutination which, at worst, may require the reactor to be shut down.

Numerous publications address feeding liquid monomers into the polymerization reactor: DE-A-2357848 describes the injection of volatile liquids into a reactor with the assistance of swing check valves. EP-A-780404, EP-B-241947 and EP-B-089691 describe various methods for introducing a gas/liquid mixture into a gas phase reactor. EP-A-697421, WO-96/4322 and WO-96/4321 describe various methods for introducing a gas/liquid mixture into a gas phase reactor which is operated at below the dew point of at least one of the constituents of the mixture. WO-94/28032 describes the introduction of volatile liquids into a gas phase reactor in order to raise the space-time yield. WO-94/25497 and WO-94/25495 describe various methods for introducing volatile liquids into a gas phase reactor in order to raise the space-time yield depending upon the apparent density of the fluidized bed.

The literature also describes the addition of inert support materials or also separating agents.

EP-A-0 422 452, for example, discloses performing the polymerization reaction in the presence of 0.3–80 wt. % of an inert material, which has an average particle diameter of 0.01 to 10 μm.

EP-A-0 530 709 discloses a process for the production of tacky polymers, in which the polymerization reaction is performed in the presence of 0.3–80 wt. % of an inert material, which has an average particle diameter of 0.01 to 150 μm.

EP-A-0 266 074 proposes performing the polymerization reaction merely in the presence of 0.005 to 0.2 wt. % of an inert pulverized material. Using this method, it is possible to select polymerization temperatures which are close to the softening temperature of the polymer to be produced.

U.S. Pat. No. 5,162,463, in contrast, teaches that agglomeration of tacky particles in a fluidized bed may be avoided by introducing an inert material coated with a polysiloxane layer into the fluidized bed.

Finally, WO-97/08211 describes the addition of stabilizers in supported form.

In all the processes described, the slightest deviations from the optimum feed rate of the monomers may cause disruption of the fluidized bed, which may, at worst, result in a reactor shut-down.

SUMMARY OF THE INVENTION

The object arises of providing a process for the avoidance of instability during the gas phase polymerization of rubber when feeding low volatility monomers, which process does not exhibit the disadvantages of the prior art.

The object is achieved according to the invention by the provision of a process in which the low volatility monomers are fed into the fluidized bed reactor supported on a particulate material.

It was completely unexpected for the person skilled in the art that using the supported monomers according to the invention should minimize the effects of low volatility monomers on the stability of the fluidized bed. The person skilled in the art would furthermore not expect that polymerization output (kg of product/h) would not be affected or would even be further raised by using the supported monomers according to the invention.

DETAILED DESCRIPTION

The supported monomers according to the invention may be used in any, preferably continuous, gas phase polymerization in which, in particular, low volatility monomers are used.

Suitable monomers are, for example, 1,3-butadiene, isoprene, styrene, 2-chlorobutadiene, 5-ethylidene-2-norbornene (ENB), 1,4-hexadiene, dicyclopentadiene, vinyl norbornene, norbornadiene, acrylonitrile, malonic acid esters, vinyl acetate, acrylic acid esters, methacrylic acid esters, as well as further olefins, dienes or trienes.

The supported monomers according to the invention may be used in combination with further gaseous monomers and/or only with inert gases, such as for example nitrogen, argon, krypton.

The supported monomers according to the invention may be used in combination with any desired fluidized bed reactor. Preferably, however, a fluidized bed reactor in particular for the gas phase production of rubber is used, the lower portion of the wall of which is of a cylindrical shape which subsequently develops into a continuously opening cone, wherein the angle of the cone, relative to the central axis, is 2–10° and the fluidized bed is higher than the cylindrical portion.

The supported monomers are preferably both added and stored under an inert gas blanket.

Suitable inorganic supports are in particular silica gels, precipitated silicas, clays, aluminosilicates, talcum, zeolites, carbon black, inorganic oxides, such as silicon dioxide, aluminum oxide, magnesium oxide, titanium dioxide, silicon carbide. Silica gels, precipitated silicas, zeolites and carbon black are preferred, with precipitated silicas and carbon black being particularly preferred. Inert in this case is taken to mean that the solids are of a nature such that or are pretreated by a pretreatment, such as for example calcination, in such a manner that the reactive surface does not prevent the formation of an active catalyst, or does not react with the monomers.

The stated inorganic solids which meet the above-stated specification and are thus suitable for use are described in greater detail, for example, in *Ullmanns Enzyklopädie der technischen Chemie*, volume 21, pp. 439 et seq. (silica gels), volume 23, pp. 311 et seq. (clays), volume 14, pp. 633 et seq. (carbon blacks), volume 24, pp. 575 et seq. and volume 17, pp. 9 et seq. (zeolites).

The inorganic solids may be used individually or as a mixture with each other.

Suitable organic solids also comprise polymeric materials, preferably in the form of free flowing powders, which are of a nature such that or are pretreated by pretreatment, such as for example drying, in such a manner that the reactive surface does not prevent the formation of an active catalyst or does not react with the monomers and have a grain size in the range from 10 to 1000 $\mu$m and a pore volume in the range from 0.3 to 15 ml/g. One example of such a material is pulverulent polypropylene.

The materials usable as supports according to the invention are preferably inert with regard to the polymerization reaction. Particulate, inorganic or organic solids are used which have a specific surface area of greater than 10, preferably of 10 to 1000 m$^2$/g (BET) and a pore volume of 0.3 to 15 ml/g, preferably of 0.5 to 5 ml/g. When carbon blacks are used, DBP adsorption is used as another criterion for suitability in addition to pore volume. DBP adsorption should be between 10 and 300 ml/100 g, preferably between 60 and 150 ml/100 g, particularly preferably between 90 and 130 ml/100 g. The support material very particularly preferably used according to the invention is silica and/or carbon black having a particle size D (v; 0.5) of 150–200 $\mu$m and a surface area of 150–250 m$^2$/g. The surface areas are here determined using the BET method and the particle sizes using a Mastersizer (operating on the principle of Fraunhofer diffraction). Particle size D (v; 0.5) indicates the particle size below which 50 vol. % of the particulate material lie.

Specific surface area (BET) is determined in the conventional manner after S. Brunauer, P. H. Emmett & Teller, *J Anorg. Chem. Soc.* 60 (2), 309 (1938), pore volume is determined by the centrifugation method after M. McDaniel, *J. Colloid Interface Sci.* 78, 31 (1980) and DBP adsorption to DIN 53 601.

The support materials are preferably of a spherical, lamellar or acicular form.

Before the support materials are used as supports for the supported monomers according to the invention, oxygen and moisture are preferably removed and the support material stored under an inert gas blanket. The oxygen and moisture may be removed using known methods by purification with nitrogen and input of heat.

The process according to the invention is suitable for the avoidance of instability in feeding low volatility monomers during the production of polymers of any kind, particularly preferably during the production of rubbers of any kind, in the gas phase.

Polymers for the purpose of the invention are, for example, poly-$\alpha$-olefins, polyisoprene, polystyrene, SBR, IIR, polyisobutene, polychloroprene, silicones and copolymers of ethylene and one or more of the following compounds: acrylonitrile, malonic acid esters, vinyl acetate, acrylic and methacrylic acid esters, vinyl acetate, acrylic and methacrylic acid esters, $\alpha$-olefins, dienes and trienes.

Rubbers for the purposes of the invention are unvulcanized, but vulcanized polymers, which may be converted into the rubber-elastic state by vulcanized Preferably, however, the process according to the invention is used for the avoidance of instability in feeding low volatility monomers during the production of EPDM in the gas phase.

The supported monomers according to the invention are produced by applying a solution of the low volatility monomer or monomers onto the particulate support. In a another preferred embodiment, the pure monomers are supported.

Preferably, the solid is set in motion before, during and optionally after application of the monomers and/or monomer solution, for example in a stirred tank with a conventional stirrer, such as for example cross-arm paddle mixer or a helical ribbon stirrer, or in a further preferred form in a plough bar mixer.

The support material may also be impregnated with the monomers and/or monomer solution in a fluidized bed. In this case, the active substance and/or the active substance solution is applied, for example by spraying by means of a nozzle, onto the support material which is fluidized by a stream of inert gas. The inert gas, optionally once entrained solvent has been removed, may be returned to the reactor via an internal circuit. The inert solvent may be reused for preparing the active substance solution.

Since the subsequent poylmerization reaction may be disrupted by air and/or moisture, it is advantageous, before application of the monomers and/or monomer solution, to dry the solid powder, to remove air and to keep it under an inert gas atmosphere before, during and after application of the monomers and/or monomer solution. Application of the monomers and/or monomer solution is preferably controlled such that the added, preferably atomized; liquid is immediately absorbed by the support, so minimized the formation of lumps and non-uniformities.

The monomers supported according to the invention may also be produced continuously.

Preferably, the quantity of liquid applied onto the solid is no more than the solid can absorb. The solid powder may thus still readily be stirred and set in motion as a free flowing powder after application of the liquid.

While it is indeed possible in principle to vary the quantity of inert solvent used within broad limits, on environmental and economic grounds the quantity is kept as low as possible as explained. The quantity is determined by the quantity and rheological properties of the monomer and the pore volume of the support. Preferably, 10 to 2000 parts of the solvent are used relative to 100 parts of the support.

Production of the supported monomers may proceed over a wide temperature range. In general, the temperature is between the melting and boiling points of the monomer or of the inert solvent. Production is conventionally performed at temperatures of –20 to 200° C., preferably of 20 to 100° C.

In a preferred embodiment, once the support material has been impregnated with the active substance solution, the inert solvent is removed by distillation. Distillation may proceed either in the same container in which impregnation was performed, or in a separate apparatus, for example a fluidized bed dryer. Neither air nor moisture must gain access during removal of the solvent. Depending upon the solvent used, distillation is performed at temperatures of 0 to 150° C., preferably at 10 to 80° C., and pressures of 0.001 mbar to 20 bar absolute, preferably of 0.001 mbar to standard pressure. Distillation may also be performed continuously. The condensate collected under inert conditions may be reused without further working up as a solvent for the active substances used in the impregnation.

In another preferred embodiment, the inert solvent is not removed or is only partially removed.

In another preferred embodiment, pure monomer is supported.

It is furthermore possible to control the level of activity of the catalyst system in the fluidized bed by adjusting the ratio of the fed quantity of supported monomer or the application rate of the low volatility monomer on the support relative to the quantity of catalyst used.

Polymerization using the supported monomers according to the invention proceeds by bringing the other gaseous monomers into contact with a catalyst system known to the average person skilled in the art and with the supported monomers according to the invention. Further gases, which either ensure dilution or heat dissipation or control molecular weight, may be admixed to the gaseous monomers. Polymerization may be performed at pressures of 1 mbar to 50 bar, preferably of 1 to 20 bar.

In general, polymerization is performed at temperatures of −20 to 250° C., preferably at 0 to 200° C., particularly preferably at 20 to 160° C.

Polymerization may be performed in any apparatus suitable for gas phase polymerization. It is thus possible, for example, to use a stirred-tank reactor, a rotary reactor or a fluidized bed reactor or a combination of these types of reactor.

In an embodiment of the present invention, particles having a core of EPDM and a shell of particulate material coated with diene are contemplated. Additionally, the present invention also provides for molding compositions which contain the rubbers of the present invention

EXAMPLES

Example 1

Supporting of 5-ethylidene-2-norbornene(ENB) on Zeosil®.

Zeosil® is a commercial product of Rhone-Poulenc Inc., USA, and is a precipitated silica.

15.8 g of dried and inertised Zeosil 1165 MP were initially introduced under a nitrogen blanket into a 2 L single-necked flask of a rotary evaporator. 13.0 g of a 60% solution of ENB in hexane were then added under nitrogen. This suspension was stirred for 2 h in the rotary evaporator. The excess n-hexane was then removed by distillation until a free-flowing powder was again obtained.

Yield: 23.0 g.

Example 2
Polymerization of Ethylene, Propylene and ENB

Polymerization was performed in a 2.5 L steel reactor equipped with a helical ribbon stirrer which is suitable for polymerization in a fixed bed. The reaction could be continuously monitored in the reactor by means of automatic data acquisition. The inert and anhydrous starter bed (200 g of PE powder) was introduced via an airlock with countercurrent nitrogen into the reactor, which had been thoroughly heat treated and inertized with nitrogen. The reactor contents were heated to 50° C. at a stirrer speed of 200 revolutions per minute and then the intended quantity of catalyst was injected with nitrogen through the airlock into the reactor. The composition of the gas phase was then established:

Partial pressures: 0.8 bar nitrogen, 1.2 bar propene, 4.0 bar ethene

Total pressure: 6 bar

Over the course of the reaction, the consumed monomer was automatically apportioned as a function of total reactor pressure. The reaction was terminated after 2.7 hours by releasing the pressure in the reactor and purging it with nitrogen.

Ethylene-bistetrahydroindenylzirconocene dichloride was used as catalyst. The quantity of catalyst was 0.010 mmol. MAO was used as co-catalyst. The Al/Zr ratio was 1000:1.

The termonomer ENB was apportioned manually from a burette during the reaction as a function of the quantity of polymer which had formed (target: 5 wt. % EB in the EPDM). 30.9 g of EPDM were produced per hour. Activity was 850 g of EPDM per hour per bar monomer pressure and per mmol of Zr.

The composition of the resultant EPDM polymer was determined by IR analysis in accordance with the usual standard, ASTM D3900, and was 66.5wt. % ethylene, 28.8 wt. % propylene and 4.8 wt. % ENB.

Example 3

A similar method was used as in Example 2. In this case, however, the supported monomer according to the invention from Example 1 was used instead of the liquid ENB. The reaction was additionally terminated after 2.1 hours. 66.4 g of EPDM were produced per hour, not including the weight of the support. Activity was 1800 g of EPBM/h . bar monomer pressure . mmol Zr. The composition of the resultant EPDM was 65.8 wt. % ethylene, 29.8 wt. % propylene and 4.4 wt. % ENB.

What is claimed is:

1. Process for the avoiding process instability during a gas phase polymerization of monomers to form a rubber when using monomers, comprising the step of feeding at least one monomer supported on a support material into a fluidized bed reactor.

2. Process according to claim 1, wherein said at least one monomer supported on a support material are used in quantities of between 0.1 and 100 wt. %, relative to the quantity of the fixed or fluidized bed.

3. Process according to claim 1, wherein the support material is selected from the group consisting of carbon black, activated carbon, silica, clay, talcum, organic solids and a mixture of at least two of these substances.

4. Process according to claim 1, wherein the level of activity of a catalyst system is established by the ratio of said at least one monomer supported on a support material to catalyst system.

5. Process according to claim 1, wherein the level of activity of a catalyst system is established by the ratio of said at least one monomer to support.

6. Process according to claim 1, wherein the support material is uniformly coated with said at least one monomer.

7. Process according to claim 1 wherein a support material having a grain size of 10 to 1000 µm is used.

8. Process according to claim 1 wherein said support material comprises an inert, particulate material which comprises a spherical, lamellar or acicular form.

9. Process according to claim 1 wherein said rubber is selected from the group consisting of EPDM, SBR, polyisoprene, polyisoprene/butadiene and NBR.

10. Process according to of claim 1 wherein said rubber comprises the diene in supported form together with ethylene and propylene.

11. Process according to claim 1, wherein during production of the at least one monomer on the support material, the support material is set in motion at least during application of the at least one monomer.

12. Process according to claim 1, wherein during production of the at least one monomer on the support material, the support material is dried before application of the at least one monomer and kept under an inert gas atmosphere, before, during and after application of the monomers.

13. Process according to claim 1, during production of the at least one monomer on the support material comprising a particulate material, the rate of application of the at least one monomer or the mixture thereof with an inert mixture component is controlled such that the added liquid is immediately absorbed by the particulate material.

14. Process according to claim 1, wherein the at least one monomer on the support material is produced in a fluidized bed reactor.

15. Process according to claim 1 wherein a mixture of two, three, four or more monomers is supported.

16. Process according to claim 1 wherein a mixture of two, three, four or more monomers, each separately supported, is used.

17. Molding compositions comprising rubber having undergone a gas phase polymerization comprising a step of feeding at least one monomer supported on a support material into a fluidized bed reactor.

* * * * *